Aug. 21, 1934.    J. H. ABRAMSON ET AL    1,971,289
SCREW DRIVER
Filed June 10, 1933    3 Sheets-Sheet 1
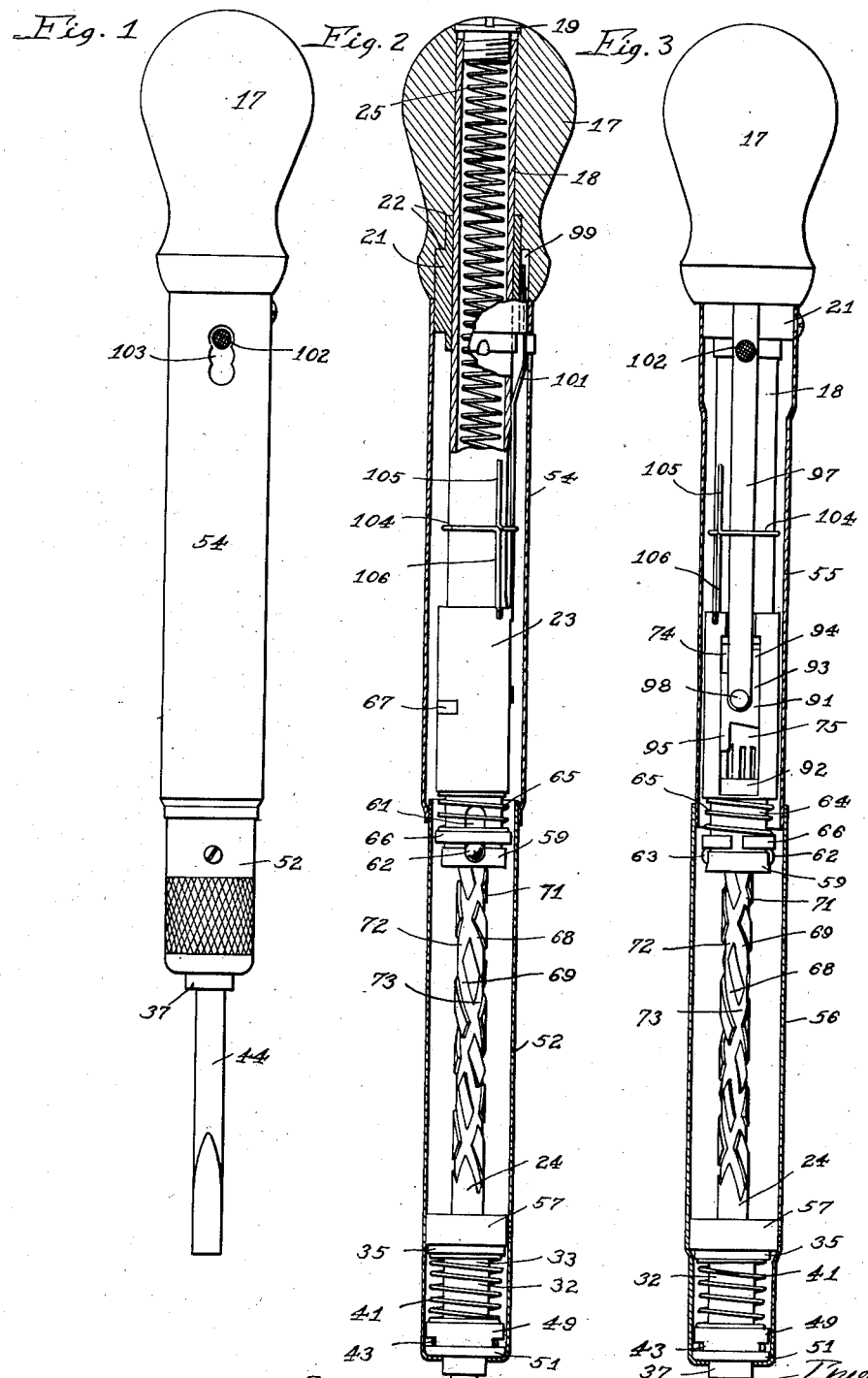

Aug. 21, 1934.    J. H. ABRAMSON ET AL    1,971,289
SCREW DRIVER
Filed June 10, 1933    3 Sheets-Sheet 2
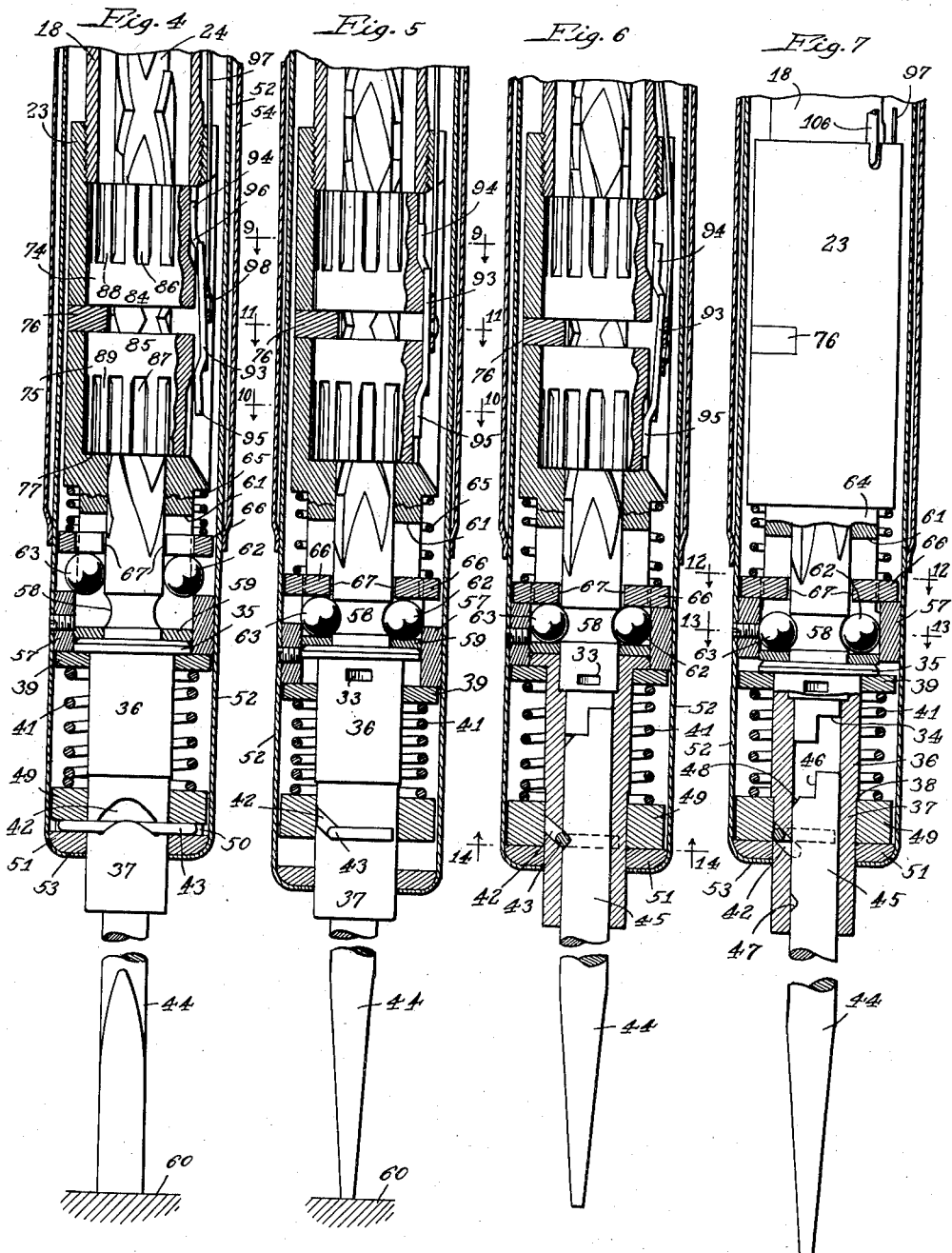
Inventors:
John Herbert Abramson
and Edwin C. Swanson
By Wilson, Dowell, McCanna
& Wintercorn
Attys.

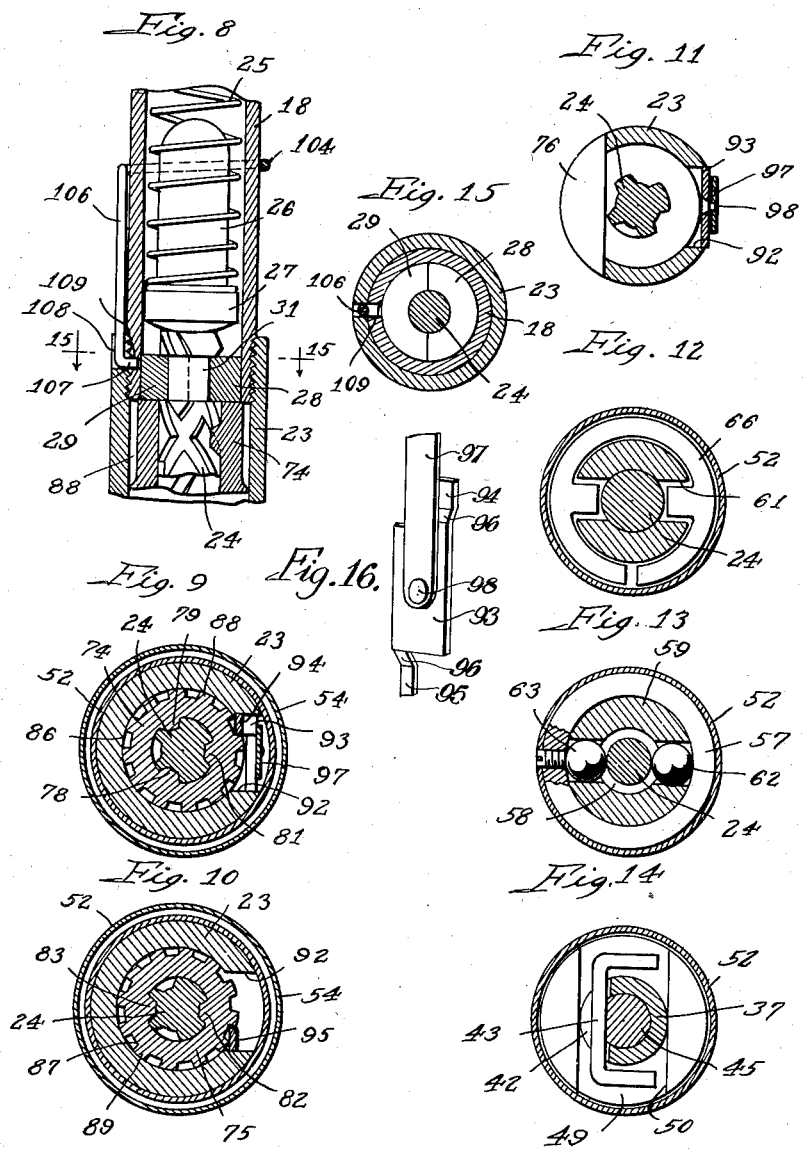

Patented Aug. 21, 1934

1,971,289

UNITED STATES PATENT OFFICE 1,971,289

SCREW DRIVER

John Herbert Abramson and Edwin C. Swanson, Rockford, Ill., assignors to Greenlee Bros. & Co., Rockford, Ill., a corporation of Illinois Application June 10, 1933, Serial No. 675,175

22 Claims. (Cl. 145—54)

This invention relates to ratchet tools and more particularly to ratchet screw drivers of improved construction.

Spiral ratchet screw drivers are used to a large extent in the wood-working trades, and in such trades have been objectionable in many instances because of the difficulty of the workmen keeping their hands entirely free from grease. This has been largely due to the fact that the spiral has been exposed to contact with the workmen's hands in its extended position. However, because of the necessity of locking the spindle to the forward end of the body and the necessity for controlling the ratchet, it has been a major problem to abolish the exposed spindle in a manner compatible with convenient and economical operation. The exposed spindle has also resulted in excessive wear between the spiral and the ratchet wheels so that these parts become prematurely worn, and thus result in improper operation. Furthermore, the spindle lock mechanisms with which we are familiar are cumbersome and inconvenient in use and by the awkward manipulations required serve to retard the speed of the workmen.

An object of the invention is to provide a generally improved screw driver of the character described wherein the spiral is completely enclosed and wherein the spiral lock and chuck lock mechanisms are actuated by longitudinal movement of the enclosing means.

Another object of the invention is to provide improved locking mechanism for locking the spindle to the body.

We have also aimed to provide improved chuck means for holding the bit, and improved means for actuating the same.

A further object of the invention is to provide improved means for supporting the inner end of the spindle and limiting the outward movement thereof.

Another object of the invention is to provide improved ratchet mechanism and improved means for actuating the ratchet mechanism.

Other objects and attendant advantages will become apparent to those skilled in the art from the following description and the accompanying drawings, in which—

Figure 1 is a side view of a screw driver embodying our invention;

Fig. 2 is a longitudinal section through the screw driver shown in Figure 1, showing the spindle in its extended position;

Fig. 3 is a longitudinal view of a modified form of screw driver showing the shell in section;

Figs. 4 to 6, inclusive, are sections through the front end of the form shown in Fig. 2, the chuck and chuck lock being rotated through 90°, Fig. 4 showing the normal position of the parts at the end of the spindle stroke, Fig. 5 showing the position of the part when the spindle locking balls have moved into position, and Fig. 6 showing the normal locked position of the spindle;

Fig. 7 is a view similar to Fig. 6, partly in section, showing the position of the parts when the bit is released;

Fig. 8 is a fragmentary section through the ratchet cage and tube, showing the rear end of the spindle and the return spring;

Fig. 9 is a section on the line 9—9 of Fig. 5;
Fig. 10 is a section on the line 10—10 of Fig. 5;
Fig. 11 is a section on the line 11—11 of Fig. 5;
Fig. 12 is a section on the line 12—12 of Fig. 7;
Fig. 13 is a section on the line 13—13 of Fig. 7;
Fig. 14 is a section on the line 14—14 of Fig. 6,
Fig. 15 is a section on the line 15—15 of Fig. 8, and
Fig. 16 is a plan view of the pawl.

The invention contemplates a ratchet screw driver of the spiral type wherein a tubular shank is positioned in a handle and carries at its forward end a ratchet cage, though it will be understood that certain features of the invention are not limited to a spiral type but may be used with equal advantage on other types of screw drivers. A spindle having right and left hand splines is positioned in the tube for longitudinal movement and extends through the ratchet cage, projecting out of the end thereof and carrying a chuck at its outer end for the reception of a bit. Ratchet wheels are positioned on the spindle within the cage and cooperate with the spindle to cause rotation thereof upon movement of the handle with respect to the spindle. Locking means serves to hold the spindle in a collapsed position and prevent longitudinal movement thereof in the cage. Telescoping sleeves surround the tube and the cage on the one hand and the spindle on the other to form a shell.

Referring first to Figures 1 and 2, a handle 17 carries a tube 18 which, in this instance, passes completely through the handle and is closed at its rear by a threaded cap 19. A ferrule 21 is secured to the sleeve by any suitable means and seats in counterbores 22 in the forward end of the handle 17. A ratchet cage 23 is threaded onto the forward end of the tube 18 (Fig. 8), the tube and cage being herein referred to as the body of the screw driver. A spindle 24 is positioned within the tube 18 and the cage 23 and is adapted to reciprocate therein, a coiled spring 25 being positioned in the tube 18 to act between the cap 19 and the rear end of the spindle to cause the spindle to move to its outer position, shown in Fig. 2, under spring pressure. A plug 26 is received within the coils of the spring and has an enlarged head 27 which abuts the inner end of the spindle to permit of rotation of the spindle with respect to the spring and provide a relatively large bearing surface therebetween. We wish it to be understood that the features of our invention are in no wise limited to this particular construction wherein a spring return of the spindle is utilized and may be used with equal facility in a screw driver lacking in such spring return means. The rear end of the spindle 24 is supported and guided in the tube 18 by means of a collar consisting of two half circles 28 and 29 which are received in an annular recess 31 spaced from the rear end of the spindle and bear against the inner surface of the tube 18. This collar also serves to limit the outward movement of the spindle by contact with the ratchet wheels, presently to be described.

A chuck, designated generally by the numeral 32, is positioned on the outer end of the spindle 24 by any suitable means, as by crimping the metal of the chuck into a slot in the spindle, as shown at 33, the forward end of the spindle being notched, as shown at 34, for the reception of a bit in a manner presently to be described. The rear end of the chuck is provided with a flange 35, and the body thereof is provided with portions 36 and 37 of decreasing diameters to provide a shoulder 38. A washer 39 is positioned on the portion 36 of larger diameter and is arranged to normally abut the flange 35, the washer being movable and being held thereagainst by a spring 41. The chuck portion 37 is provided with an inclined slot 42 sloping inward from back to front and intersecting the bore of the chuck, the slot being adapted to receive a transverse pin 43 having its ends bent at right angles as best shown in Fig. 14. A screw driver bit 44 has a shank 45 of a size to be received in the bore of the chuck within relatively close limits, the inner end of the shank being slotted, as shown at 46, complemental to the slot 34 in the end of the spindle so that when the bit is completely inserted in the chuck, as shown in Fig. 6, driving connection will be established therebetween. The chuck is also provided with a notch 47 positioned to coincide with the slot 42 when the bit is in its driving position and to receive the pin 43 to retain the bit in the chuck. The bit may be bevelled, as shown at 48, to facilitate the entrance of the bit into the chuck. The pin 43 is normally maintained at the inner end of the slot 42 by a collar 49 slidably positioned on the portion 37 of the chuck and by the spring 41 which bears against the inner side of the collar 49 to maintain spring pressure thereon and on the pin 43, the ends of the pin 43 resting in a transverse recess 50 milled in the front of the collar 49. A second collar 51 is positioned on the portion 37 of the chuck on the forward side of the pin 43, the pin thus being interposed in the recess 50 between the collars 49 and 51 so that the collars have contact, and manual movement of the collar 51 toward the rear of the screw driver causes the pin 43 to move up along the inclined faces of the slot 42 to release the bit 44. Upon release of the collar 51, the spring 41 and collar 49 brings about movement of the pin in the opposite direction to engage the bit.

A sleeve 52 surrounds the spindle 24 and the major portion of the chuck 32, the forward end of the sleeve being rolled in, as shown at 53, to bear against the front side of the collar 51. The sleeve 52 telescopes inside of a sleeve 54 which is supported on the ferrule 21 in the handle 17, the sleeve 54 enclosing the tube 18 and ratchet cage 23. The sleeves 52 and 54 thus completely enclose the operating parts of the screw driver presenting a neat and trim appearance and preventing contact of the hands or clothes of the operator with the spindle 24 or preventing entrance of dirt or other extraneous matter into the mechanism to interfere with its operation and bring about excessive wear between the spindle and the ratchet mechanism. It will be understood that the relative positions of the sleeves 52 and 54 may be changed, as shown in Fig. 3, wherein an inner sleeve 55 is attached to the ferrule 21 and telescopes into an outer sleeve 56 carried by the spindle. In many instances the arrangement of sleeves shown in Fig. 3 will be found to be more satisfactory, whereas in other uses that shown in Fig. 2 may be preferred. A spindle locking collar 57 is positioned on the inner walls of the sleeve 52 in a position to normally bear against the periphery of the flange 35 when the washer 39 abuts the side of the flange 35 and the pin 43 occupies its engaged position.

Means are provided for locking the spindle 24 in its closed position, such as shown in Figure 1, thereby preventing relative longitudinal movement between the spindle 24 and the tube and cage 18 and 23. This consists of the collar 57 which, in its normal position just described, is concentric with a groove 58 on the spindle 24, the groove being located in close proximity to the flange 35 of the chuck. The forward end of the ratchet cage 23 has a ball-carrying member 59 affixed thereto of smaller diameter than the remainder of the cage, the ball-carrying member being provided with a pair of ball races 61 on opposed sides of the member. Balls 62 and 63 are positioned in the races 61 and are of slightly greater diameter than the thickness of the wall. The portion 59 is reduced slightly in diameter, as shown at 64, for the reception of a spring 65 which bears at one end against the cage 23 and at its opposite end against a ball retainer 66 having inwardly projecting fingers 67 extending into the races 61, the spring and retainer thus normally maintaining the balls 62 and 63 toward the outer end of the race. The ball-carrier 59 is of a diameter to be closely received within the collar 57, and the balls 62 and 63 are of a diameter such that when flush with the inner surface of the ball-carrier 59, they will not enter into the collar 57 and will be moved backward in the races 61 by contact with the collar, as shown in Fig 4, the spring 65 permitting such movement. During such movement, a smooth portion 67a on the spindle maintains the balls flush with the inner surface of the ball carrier. However, when the sleeve 52 is manually moved to the position shown in Fig. 5 which is accomplished by placing the bit 44 against an object, such as shown at 60, bringing the spindle into its collapsed position, such as shown in Fig. 4, and, with the bit against the object 60, manually forcing the sleeve downward, the collar 57 being attached thereto, compressing the spring 41 by movement of the washer 39. This moves the collar 57 out of concentricity with the groove 58 and also permits the balls 62 and 63 to move forward in the races under the influence of the spring 65 to a position opposite the groove. Upon release of the sleeve 52, the collar 57 will move backward to its normal position under the influence of the spring 41 and simultaneously force the balls 62 and 63 into the groove. When the sleeve 52 and collar 57 have returned to their normal position, as shown in Fig. 6, the balls are trapped between the collar and the spindle and project beyond the inner surface of the ball carrier 59 into the groove. The spindle may be released from the body by movement of the sleeve 52 back to the position shown in Fig. 5, whereupon forward movement of the spindle with respect to the member 59 causes the balls 62 and 63 to move laterally in the races by longitudinal movement of the spindle with respect to the ball carrier, the balls rolling up the side of the groove back into the position shown in Fig. 4. Thus, the spindle is locked to the body by a forward movement of the sleeve 52 and is also released from the body by a similar movement in conjunction with a subsequent relatively forward movement of the spindle with respect to the sleeve 52. It will be seen, however, that the spindle 24 may rotate with respect to the body when in the locked position so that the ratchet mechanism, presently to be described, is effective regardless of the position of the spindle. Thus, Fig. 4 shows the normal position of the parts of the end of the driving stroke, the balls 62 and 63 being moved backward in the races to prevent locking of the spindle to the body so that the body may be immediately returned for successive strokes. Fig. 5 shows the position of the parts after the sleeve 52 has been moved downward so as to permit the balls to enter into the groove 58, and Fig. 6 shows the position of the parts upon the release of the sleeve, the collar 57 trapping the balls within the groove 58. Fig. 7 shows the position of the parts when the sleeve has been moved backward to release the tool, the ball retainer 66 being moved backward against the tension of the spring 65 by the collar 57, the spring 65 thus permitting compression of the forward spring 41 and corresponding movement of the collars 51 and 49 to withdraw the pin 43 in the slot 42.

The spindle 24 is provided with three helical grooves 68, 69 and 71 oriented on the spindle in a direction from right to left facing Figs. 1 to 7, and in a clockwise direction facing Figs. 9, 10 and 11, and with a pair of helical grooves 72 and 73 arranged to cause rotation of the spindle in the opposite direction through cooperation with ratchet wheels, presently to be described. Ratchet wheels designated generally by the numerals 74 and 75 are positioned within the ratchet cage 23 and are best of a size to be received therein within relatively close limits. A key 76 is positioned transversely in the cage 23 and projects into the cage chamber for the purpose of spacing the wheels and taking the end thrust thereon. The wheel 75 thus has end thrust against a shoulder 77 at the forward end of the cage and against the key 76, while the wheel 74 has end thrust against the key and against the forward end of the tube 18. The wheel 74 likewise serves as a stop for the collar portions 28 and 29 to limit the outward movement of the spindle. The wheel 74 is provided with three inwardly extending splines 78, 79 and 81 engaging the grooves 68, 69 and 71, so that when the ratchet wheel 74 is prevented from rotating in a counterclockwise direction and pressure is applied to the handle 17, the spindle will be driven in a clockwise direction. Likewise, the wheel 75 is provided with splines 82 and 83 engaging the grooves 72 and 73 of the spindle so that when this ratchet gear is prevented from movement in a clockwise direction facing Fig. 10, the spindle will be caused to rotate in a counterclockwise direction. The wheels 74 and 75 are provided with hubs 84 and 85 in adjacent spaced relationship and with a plurality of slots 86 and 87 on the outer surface of the wheels extending in a longitudinal direction from the hubs 84 and 85 to the opposite ends of the gears. The slots 86 and 87 thus provide teeth 88 and 89, the outer faces of which lie on the same cylindrical surface as the hubs.

A ratchet pawl 91 shown in Fig. 16 is positioned in a longitudinal slot 92 in the ratchet cage 23, the pawl being of such a width as to bear against the opposed sides of the slot. The pawl consists of a single piece of metal having a center body portion 93 and fingers 94 and 95 at its opposite ends and at diagonally opposite corners. These fingers are bent downward so as to lie in a lower plane than the body portion 91, as shown at 96 (Figs. 4, 5 and 6), the amount of this bend being such that when the body rests upon the hubs 84 and 85 of the ratchet wheels, the inner edges of the fingers will rest substantially on the bottom of the grooves 86 and 87, as shown in Figs. 5, 9 and 10. A spring 97 is attached to the body 93 of the pawl by means of a rivet 98, or in some other suitable manner, and extends backward along the body 18 and into a recess 99 in the handle 17. Near its rear end, it is curved upward, as shown at 101, and carries a button 102 arranged to project through an opening 103 in the sleeve 97. The spring is held to the tube 18 by means of a wire clip having a circular portion 104 and longitudinally extending end portions 105 and 106, these end portions having a spring tension against the side of the tube. The end portion 106 has a downwardly turned end 107 (Fig. 8) which extends through a slot 108 in the rear of the ratchet cage 23 and into an opening 109 in the tube 18, thus serving to prevent the ratchet cage from accidentally unscrewing from the tube or changing its rotative position with respect thereto. The circular portion of the clip 104 serves to maintain a spring tension downward on the pawl 91 to maintain it in contact with the ratchet wheels 74 and 75.

In controlling the operation of the ratchet wheels, the pawl is moved by means of the button 102 between the positions shown in Figs. 4, 5 and 6. When the pawl occupies the position shown in Fig. 5, the ratchet wheels are so held that movement of the handle will not serve to drive the spindle in either direction since the fingers 104 and 105 each engage a ratchet wheel, as shown in Figs. 9 and 10. From these figures it will be seen that the edge of the finger bears against one side of the ratchet wheel teeth, while the opposite edge of the finger bears against the side of the slot 92, thereby preventing movement of either ratchet wheel in a driving direction by pressure placed on the handle 17. When the pawl is moved to the position shown in Fig. 4, the finger 94 engages the ratchet wheel 74 so that pressure applied to the handle 17, when the bit is held against an object, causes the spindle to move therein and brings about clockwise movement of the spindle and bit so as to insert a screw. When the spindle is drawn out of the tube, the ratchet wheel will be caused to move in the opposite direction so that the finger 94 will ratchet over the teeth. It will be observed that when the pawl is moved from the position shown in Fig. 5 to that shown in Fig. 4, the finger 95 rides up onto the hub 85 of the gear 75 and tilts the finger 94 further into the groove of the wheel 74. Likewise movement of the pawl from the position shown in Fig. 5 to that shown in Fig. 6 causes the pawl to tilt about a lateral axis, the finger 95 engaging the gear 75 so that the spindle will be rotated in the opposite direction during its driving stroke. Attention is directed to the fact that upon movement of the pawl from the position shown in Fig. 5 to that shown in Fig. 4, or in Fig. 6, the finger which simultaneously moves out of engagement merely moves up the sloping end of the groove.

It will be seen from the above description and the drawings that we have provided a screw driver of the ratchet type having numerous novel and useful features. Means are provided for enclosing both the body and the spindle of the screw driver and conveniently operable lock means is provided for locking the spindle to the body, the lock means being actuated through outward movement of the spindle enclosing sleeve with respect to the spindle. Inward movement of the same sleeve causes the tool retaining elements to release the tool for the insertion and removal of the tool from the chuck. Novel and efficient ratchet mechanism is provided wherein the ratchet wheels are provided with hubs and teeth whose outer surfaces lie on the same cylindrical surface as the hubs and a one-piece pawl is longitudinally movable and laterally tiltable to control the rotation of the wheels. Likewise, novel means are provided for controlling the pawl from a point adjacent to the handle such as to prevent interference with the telescoping of the sleeves and to conveniently locate the control button. Likewise, novel spring and spring clip means is provided for placing tension on the pawl and for preventing relative rotation between the tube and the ratchet cage. Another novel feature is the means for supporting and guiding the rear end of the spindle so that the spindle is accurately guided in the tube, which also serves as a stop for the outward movement of the spindle. A still further feature of the invention is the projection of three spiral grooves on the spindle utilized to drive the spindle in a clockwise direction, such as used for inserting the screws so as to provide adequate bearing surface between the ratchet wheel and the spindle during the period of operation when the greatest load is placed on the tool. In this way, the life of the tool is materially increased, since tools of this type are commonly discarded because of excessive wear at this point. A still further feature of the invention lies in the construction of the chuck and chuck lock wherein various parts of the chuck lock are caused to function, not only in locking the tool in the chuck but in locking the spindle to the body.

While we have thus illustrated and described a specific embodiment of our invention, we are aware that numerous alterations and changes may be made therein without materially departing from the spirit of the invention or the scope of the appended claims, in which—

We claim:

1. The combination in a spiral screw driver of a handle, a body on the handle, a spindle movable longitudinally in and out of the body, ratchet means at the forward end of the body acting between the body and the spindle to control the operation thereof, a sleeve enclosing the body substantially throughout its length, a finger button extending through the sleeve near the handle, means within the sleeve for actuating the ratchet means from the button, a sleeve carried at its forward end on the forward end of the spindle and shaped to telescope with the first-mentioned sleeve on longitudinal movement of the spindle, and interlocking means carried by the body and the spindle arranged to be actuated by movement of the second-mentioned sleeve with respect to the spindle.

2. The combination in a spiral screw driver of a body, a spindle movable longitudinally into and out of the body, a sleeve enclosing the body substantially throughout its length, a sleeve carried at its forward end on the forward end of the spindle and shaped to telescope with the first-mentioned sleeve on longitudinal movement of the spindle, and interlocking means carried by the body and the spindle arranged to be actuated by movement of the second-mentioned sleeve with respect to the spindle.

3. The combination in a spiral screw driver of a body, a spindle movable longitudinally into and out of the body, a chuck at the forward end of the spindle, a sleeve enclosing the body substantially throughout its length, a sleeve carried on the spindle substantially enclosing the same and shaped to telescope with the first-mentioned sleeve on longitudinal movement of the spindle, interlocking means carried by the body and the spindle arranged to be actuated by movement of the second-mentioned sleeve in one direction with respect to the spindle, and means on the chuck for holding the tool, releasable by movement of said sleeve in the opposed direction.

4. The combination in a spiral screw driver of a body, a spindle movable longitudinally into and out of the body, a chuck at the outer end of the spindle for holding a bit, a sleeve attached to the body, and a sleeve carried on the spindle enclosing the spindle and chuck and telescoping with the first-mentioned sleeve, the sleeves enclosing the body, spindle and chuck in all positions of the spindle.

5. The combination in a ratchet mechanism of a spindle, a pair of ratchet wheels on the spindle secured against longitudinal movement, said wheels having a smooth hub and longitudinal teeth of equal radius, and a pawl having a flat body and a finger on each end at diagonally opposed corners, the fingers being depressed to a lower plane than the body whereby to be received between the teeth of the wheels when the body rests upon the hubs.

6. The combination in a ratchet mechanism of a ratchet cage having a longitudinal opening, a spindle in the ratchet cage, a pair of ratchet wheels on the spindle within the cage secured against longitudinal movement, said wheels having smooth hubs and longitudinal teeth of the same radius as said hubs, and a longitudinally movable pawl in said longitudinal opening, said pawl having a body and a finger on each end at diagonally opposed corners, the fingers being depressed from the plane of the body for reception between the teeth of the wheels and the side of the longitudinal opening to prevent rotation of the gears.

7. The combination in a ratchet mechanism of a ratchet cage having a longitudinal opening, a spindle in the ratchet cage, a pair of ratchet wheels on the spindle within the cage secured against longitudinal movement, each of said wheels comprising a cylinder having spaced longitudinal grooves on the periphery terminating at one end short of the end of said cylinder to provide a smooth surfaced hub, the hubs being placed in adjacent relationship, and a longitudinally movable pawl in said longitudinal opening, said pawl having a body and a finger on each end at diametrically opposed corners, the fingers being depressed from the plane of the body for reception between the teeth of the wheels and the side of the longitudinal opening to prevent rotation of the gears.

8. The combination in a ratchet mechanism of a ratchet cage having a longitudinal opening, a spindle in the ratchet cage, a pair of ratchet wheels on the spindle within the cage secured against longitudinal movement, and a pawl in said longitudinal opening having a body and a finger on each end thereof at diagonally opposed corners, the fingers being depressed from the plane of the body for reception between the edge of said grooves and the side of the longitudinal opening, said pawl being movable longitudinally in opposed directions from a central position in which said body rides upon said opposed hubs and said fingers engage both wheels to positions in which one of said fingers rides upon said hubs and the other finger engages one of said wheels whereby to prevent ratcheting of said wheels or cause either to ratchet.

9. The combination in a ratchet screw driver, of a body comprising a tube and a ratchet cage on the end of the tube, a ratchet spring extending along the tube, and a clip comprising a circular loop of spring wire passing around the tube and the spring to hold the spring against the tube, the ends of the wire extending longitudinally of the tube and bearing against the surface thereof.

10. The combination in a ratchet screw driver of a body comprising a tube and a ratchet cage threaded on the end of the tube, the tube having a side opening and the cage a slot coinciding therewith, a ratchet spring extending along the outer wall of the tube, and a clip of spring wire extending around the tube and spring and having its ends extending longitudinally along the tube, one of said ends extending through said slot and terminating within said side opening to prevent rotation of the cage with respect to the tube.

11. The combination in a spiral screw driver of a body, a spindle movable longitudinally in the body having an annular groove, a ball supporting element carried by the body, a ball carried by the latter, a collar carried by the spindle movable longitudinally thereof to force the ball into the groove, and means to hold the collar in a position to retain the ball in said groove to prevent longitudinal movement of the spindle.

12. The combination in a spiral screw driver of a body, a spindle movable longitudinally in the body through a driving stroke and having an annular groove at one end, a collar supported on the spindle concentric with said groove and movable thereon in a direction away from the body, a ball carried by the body arranged to be displaced by the collar at the end of the driving stroke during normal operation and to be projected into said groove by movement of said collar to lock the spindle to the body.

13. The combination in a spiral screw driver of a body, a spindle movable longitudinally in the body in a driving stroke, having an annular groove, a ball positioned to come into coincidence with said groove at the end of said driving stroke to lock the spindle to the body, means resiliently supporting the ball on the body for longitudinal movement, and a collar carried by the spindle normally concentric with said groove, arranged in said normal position to move said ball at the end of the driving stroke and prevent coincidence of said ball and groove.

14. The combination in a spiral screw driver of a body, a spindle movable longitudinally in the body in a driving stroke having an annular groove, a ball-carrying element carried on the body and surrounding the spindle, balls in said ball-carrying element of greater diameter than the thickness of said element, a collar on the spindle concentric with said groove of an internal diameter to receive the ball-carrying element but not the balls, and spring means normally maintaining the collar in said concentric position, compressible by manual movement of the collar for reception of the balls in said groove, said spring serving to return the collar after such reception to trap the balls in said groove.

15. The combination in a spiral screw driver of a body, a spindle movable longitudinally in the body having an annular groove, a ball supporting element carried by the body arranged to be concentric with said groove at a predetermined relative position of the spindle and body, a ball in said ball supporting portion of greater diameter than the thickness of said ball supporting element, a collar carried by the spindle movable longitudinally to project the ball into said groove, and means for holding the collar in a position to retain the ball in the groove to lock the spindle against longitudinal movement.

16. The combination in a spiral screw driver of a body, a spindle movable longitudinally in the body having an annular groove, a ball supporting element carried by the body having an opening arranged to coincide with said groove at a predetermined relative position of the spindle and body, a ball in said opening of greater diameter than the wall thickness of said element, and a collar carried by the spindle normally positioned to contact said ball and prevent coincidence thereof with said groove but movable manually at a predetermined position of the body and spindle to project the ball into said groove to secure the spindle in said predetermined position.

17. The combination in a spiral screw driver of a body, a chuck having an inclined slot, a transverse pin for releasably holding a bit in said chuck, a longitudinally movable spindle in said body carrying the chuck at its outer end and having an annular groove adjacent to the chuck, a ball adapted for partial reception in the groove to secure the spindle to the body, a slidable washer on the chuck spaced from said slot, a pair of movable collars on said chuck on opposite sides of said pin, a spring acting between the washer and said collars, stop means for limiting movement of the washer, said spring serving to maintain the pin in the slot and said washer against the stop, a sleeve enclosing the chuck, washer, collars and spring having a bearing against the collars and movable inward to move the collars and pin against the action of the spring, and a collar on the sleeve concentric with the groove on the spindle positioned to move the washer against the spring pressure upon outward movement of the sleeve to expose the groove for admission of the ball to lock the spindle to the body.

18. The combination in a spiral screw driver of a body having longitudinal slots forming ball races, a spindle movable longitudinally in the body having a flange for receiving the impact of the body at the end of a driving stroke and having an annular groove, balls in said ball races of a diameter to project out of said races, spring means for maintaining said balls at the forward end of said races, a collar carried by the spindle, spring means for normally maintaining the collar in a position concentric with the groove, the collar having an internal diameter shaped to receive the body for contact with said flange and to move the balls in said races against the spring pressure thereon to normally prevent entrance of the balls into the groove, the collar being manually movable against the pressure of said last-mentioned spring to project the balls into the groove and secure the spindle to the body.

19. The combination in a spiral screw driver of a body, a spindle movable longitudinally into and out of the body, a chuck at the forward end of the spindle, a sleeve enclosing the body substantially throughout its length, a sleeve carried on the spindle substantially enclosing the same and shaped to telescope with the first-mentioned sleeve on longitudinal movement of the spindle, interlocking means carried by the body and the spindle for releasably securing the body and the spindle together, and means on the chuck for releasably holding a tool.

20. The combination in a spiral screw driver of a body, a spindle movable longitudinally into and out of the body, a sleeve enclosing the body substantially throughout its length, a sleeve carried at its forward end on the forward end of the spindle and shaped to telescope with the first-mentioned sleeve on longitudinal movement of the spindle, interlocking means carried by the body and the spindle within said sleeves, and means for actuating said interlocking means from the exterior of said sleeves.

21. The combination in a spiral screw driver of a body, a spindle movable longitudinally into and out of the body, a chuck at the forward end of the spindle, a sleeve enclosing the body substantially throughout its length, a sleeve carried on the spindle substantially enclosing the same and shaped to telescope with the first-mentioned sleeve on longitudinal movement of the spindle, and latch means within the sleeves for securing the spindle to the body, said last-mentioned sleeve being movable outwardly with respect to the spindle to latch and to release the spindle from the body.

22. The combination in a spiral screw driver of a body, a spindle movable longitudinally into and out of the body, a tool chuck at the forward end of the spindle, a sleeve enclosing the body substantially throughout its length, a sleeve carried on the spindle substantially enclosing the spindle and the chuck and shaped to telescope with the first-mentioned sleeve on longitudinal movement of the spindle, means on the chuck for holding a tool releasable by movement of the last-mentioned sleeve in one direction, and spring means to return the sleeve to retain the tool.

JOHN HERBERT ABRAMSON.
EDWIN C. SWANSON.